United States Patent [19]

Atsukawa

[11] Patent Number: 5,660,495
[45] Date of Patent: Aug. 26, 1997

[54] LOCKING-UNLOCKING MECHANISM FOR TELESCOPIC DEVICE

[75] Inventor: Masumi Atsukawa, Tokyo, Japan

[73] Assignee: Japan Skyrobot Co., Ltd, Tokyo, Japan

[21] Appl. No.: 552,255

[22] Filed: Nov. 2, 1995

[51] Int. Cl.⁶ .................................................. F16B 7/10
[52] U.S. Cl. ...................... 403/377; 403/109; 403/31; 403/DIG. 1; 248/405
[58] Field of Search ..................... 403/377, 376, 403/380, 109, 104, 31, DIG. 1, 321, 322, 324, 325, 319, 320; 248/161, 405, 407

[56] References Cited

U.S. PATENT DOCUMENTS

| | | | |
|---|---|---|---|
| 3,474,833 | 10/1969 | Garrette, Jr. et al. | 403/109 X |
| 3,612,468 | 10/1971 | Hoppl et al. | 248/405 |
| 4,627,602 | 12/1986 | Sporck | 248/405 X |
| 4,793,197 | 12/1988 | Petrovsky | 403/109 X |
| 4,860,987 | 8/1989 | Werner | 248/405 |
| 5,282,593 | 2/1994 | Fast | 248/405 |

FOREIGN PATENT DOCUMENTS

| | | | |
|---|---|---|---|
| 192094 | 8/1986 | European Pat. Off. | 403/109 |
| 93108 | 4/1990 | Japan | 403/109 |
| 670899 | 7/1989 | Switzerland | 403/109 |
| 2069651 | 8/1981 | United Kingdom | 403/109 |

*Primary Examiner*—Harry C. Kim
*Attorney, Agent, or Firm*—Rogers & Killeen

[57] ABSTRACT

A locking-unlocking mechanism is disclosed which is capable of realizing firm and reliable connection between pipes when a plurality of pipes telescopically arranged are extended, and capable of disconnecting the connected pipes rapidly and precisely. The locking-unlocking mechanism for a telescopic device comprising a plurality of pipes which are telescopically arranged, the locking-unlocking mechanism comprising: a bottom provided at the lower end of the lowermost pipe; a cam bar formed with a cam at its upper end, the cam bar being a rod vertically mounted on the bottom of the lowermost pipe and extending through the bottoms of the pipes other than the bottom of the lowermost pipe; a bottom provided at the lower end of each of the pipes other than the lowermost pipe, the bottom including: a cam follower disposed in tangential relationship with the cam bar and actuated by the cam, and key members connected to each other by the cam follower and each connected to a spring for biasing the cam follower against the cam bar, the key members being thereby protrudable from a side surface of the bottom; and key member receiving members provided at a position in the vicinity of the upper end of the inner surface of each of the pipes other than the uppermost pipe for receiving the key members caused to protrude from the side surface of the bottom by the action of the cam.

18 Claims, 14 Drawing Sheets

LOCKING-UNLOCKING MECHANISM FOR TELESCOPIC DEVICE

BACKGROUND OF THE INVENTION

1. Field of the Invention

The present invention relates to a locking-unlocking mechanism, which is used in a telescopic device comprising a plurality of pipes telescopically arranged, for locking and unlocking the pipes at times of extension and retraction.

2. Description of the Prior Art

Heretofore, telescopic mechanisms have been known which comprise a plurality of pipes telescopically arranged to be capable of constituting a columnar structure.

In conventional telescopic devices, engineers have devoted their efforts primarily to providing a locking-unlocking mechanism capable of simply and smoothly attaining reliable and firm connection between pipes during extension and disconnection of the connected pipes in retraction operation. In telescopic devices employing extension-retraction mode by means of fluid pressure, a locking-unlocking mechanism is not necessarily required. However, this mode has a problem of leakage of a fluid during extension. Accordingly, it is desired to provide a locking-unlocking mechanism between pipes.

Performance in connecting extended pipes together and disconnecting the connected pipes determines strength and stiffness of the pipes in extended state or reflects on rapid and smooth extension-retraction movement. Accordingly, the connection required to be firm and reliable and the disconnection is required to be tarried out rapidly and precisely. At the same time, a locking-unlocking mechanism is required to have a structure which is simple in view of cost and light weight, which is not susceptible to failure, and whose maintenance is easy in terms of durability. Of those which have heretofore been proposed, however, none is satisfactory.

SUMMARY OF THE INVENTION

The present invention has been made in view of these problems. It is, therefore, an object of the present invention to provide a locking-unlocking mechanism capable of realizing firm and reliable connection between pipes when a plurality of pipes telescopically arranged are extended, and capable of disconnecting the connected pipes rapidly and precisely.

According to the present invention, there is provided a locking-unlocking mechanism for a telescopic device comprising a plurality of pipes which are telescopically arranged, the locking-unlocking mechanism comprising:

a bottom provided at the lower end of the lowermost pipe, a cam bar formed with a cam at its upper end, the cam bar being a rod vertically mounted on the bottom of the lowermost pipe and extending through the bottoms of the pipes other than the bottom of the lowermost pipe, a bottom provided at the lower end of each of the pipes other than the lowermost pipe, the bottom including:

a cam follower disposed in tangential relationship with the cam bar and actuated by the cam, key members connected to each other by the cam follower and each connected to a spring for biasing the cam follower against the cam bar, the key members being thereby protrudable from a side surface of the bottom, and key member receiving members provided at a position in the vicinity of the upper end of the inner surface of each of the pipes other than the uppermost pipe for receiving the key members caused to protrude from the side surface of the bottom by the action of the cam.

DESCRIPTION OF THE PREFERRED EMBODIMENTS

Figure 1:
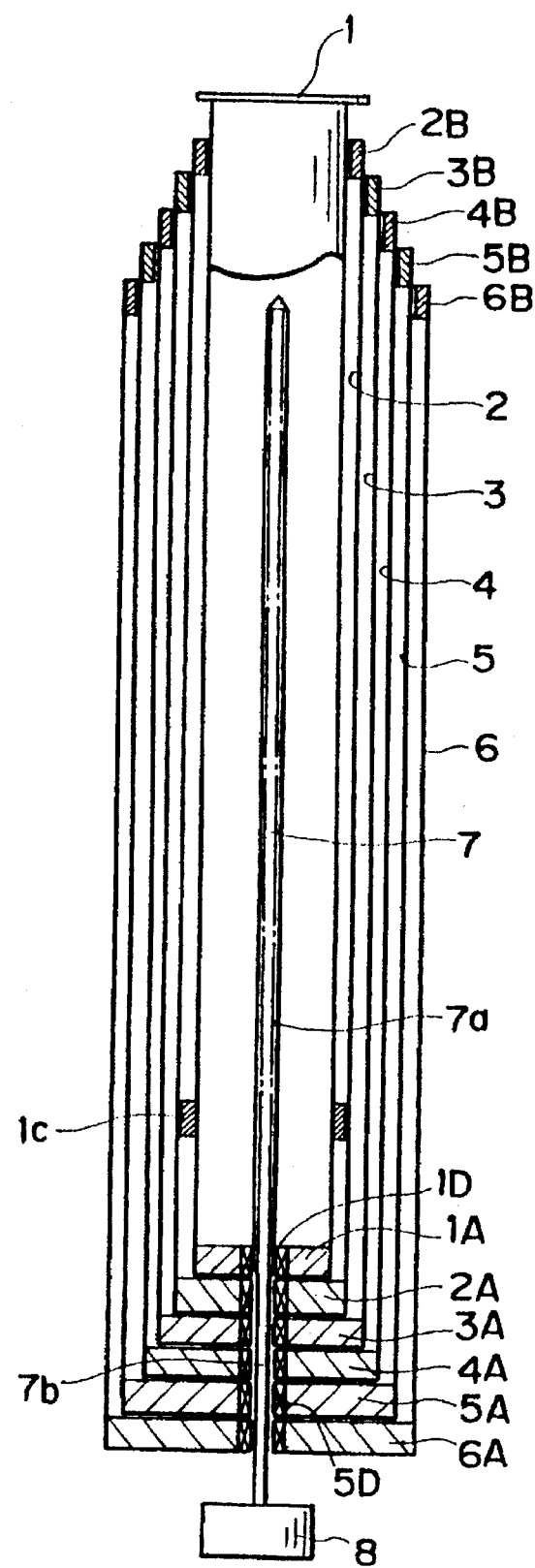
FIG. 1 is a sectional front view of a telescopic device provided with one embodiment of the mechanism according to the present invention, which shows a first position of a pipe in extension from collapsed condition.

Now, embodiments of the present invention will be described with reference to the accompanying drawings.

In FIGS. 1 to 9, reference characters 1 to 6 represent pipes so formed as to have a larger inner diameter in sequence. The pipes 1 to 6 are arranged in such a manner that one having a smaller diameter is telescopically inserted into another having a larger diameter in sequence, and thus, arranged to be telescopically extensible.

Figure 2:
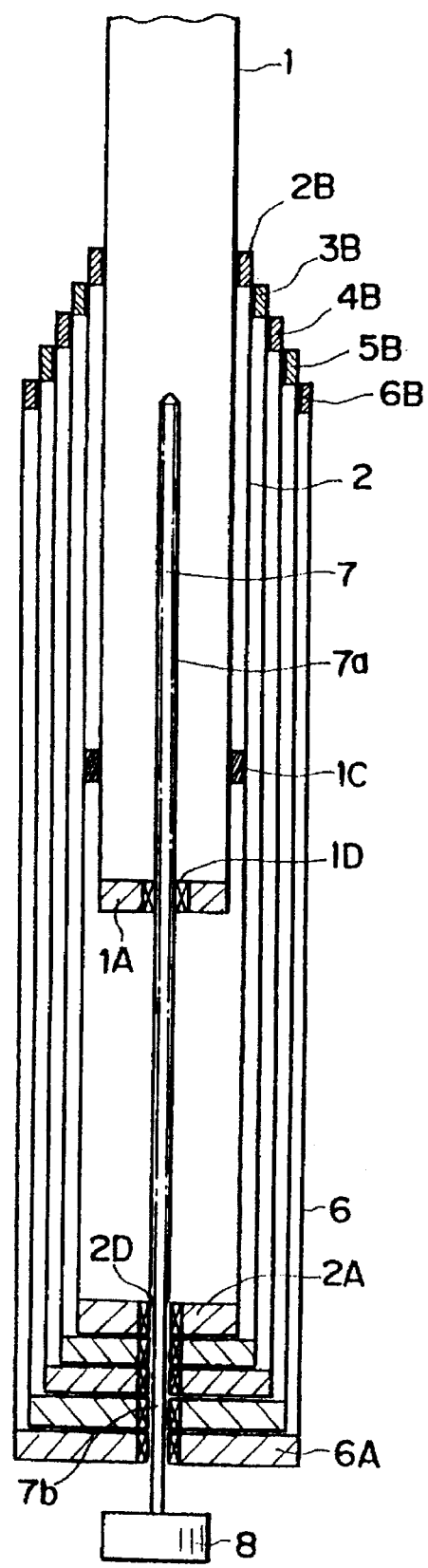
FIG. 2 is a sectional front view of a telescopic device provided with one embodiment of the mechanism according to the present invention, which shows a second position of a pipe in extension from collapsed condition.
Figure 3:
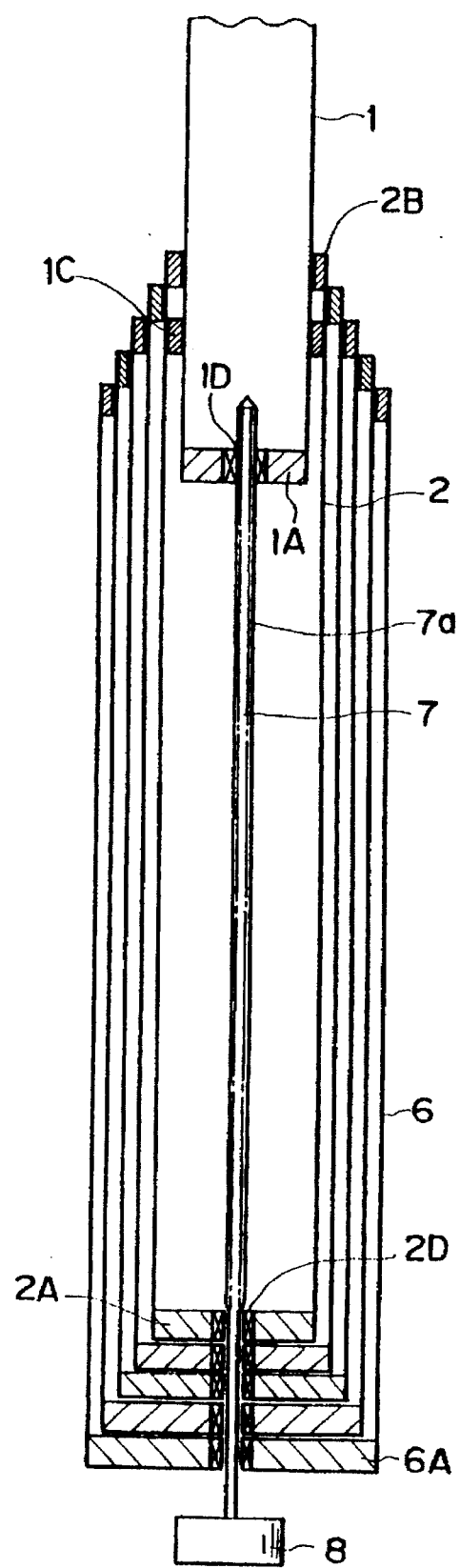
FIG. 3 is a sectional front view of a telescopic device provided with one embodiment of the mechanism according to the present invention, which shows a third position of a pipe in extension from collapsed condition.

In this embodiment of the locking-unlocking mechanism of the present invention, in extension operation, the pipe having the smallest diameter is first and the others are then caused to ascend in order of diameter size in such a manner that one having a smaller diameter is caused to ascend in another having a larger diameter in which the one is inserted, as shown in FIGS. 1 to 3, by means of a nut member provided in each of bottoms of the pipes and a threaded rod vertically mounted and extending through the bottoms of the retracted pipes. At the terminal of the ascent, a key member is released from action of a cam and caused to fit into a receiving member in the pipe having a larger diameter by urging action of a spring, thereby locking the pipe having a smaller diameter at the ascended position. On the other hand, in retraction operation, the key member which has been advanced is retracted into the pipe having a smaller diameter by the action of the cam, thereby unlocking the locked pipe. (See FIGS. 4 to 9.)

In the drawings, reference characters 1A to 6A represent bottoms provided at the lower ends of the pipes 1 to 6, respectively. According to the present invention, each of the bottoms 1A to 6A is provided with the mechanism of the present invention which will be described below. Reference characters 2B–6B represent stoppers formed at and inwardly projecting from the upper ends of the inner surfaces of the pipes 2–6, respectively. Reference characters 1C represent a limiter member formed at and outwardly projecting from a position near the lower end of the outer surface of the pipe 1 having the smallest diameter, which is blocked by the stopper member 2B of the pipe 2 into which the pipe 1 is inserted to prevent the pipe 1 from further ascending. In this connection, with respect to the above-mentioned limiter member, although only the limiter member 1C of the pipe 1 is shown in FIGS. 1–9, the other pipes 2–5 are also provided with such limiter members. Further, the limiter member 1C serves also as a positioner element for aligning a key member 1E with a receiving member 2F which are to be described below.

Reference character 7 represents a threaded rod placed extending first through the center of the bottom plate 6A of the pipe 6 having the largest diameter, i.e., the lowermost pipe 6 and then through the bottoms 5A–1A of the other pipes 5–1 in sequence. A threaded portion 7a is formed from the position at which the bottom 1A of the pipe 1 engages with the rod 7 when the pipes 1–6 are collapsed as shown in FIG. 1 to the upper end of the rod 7. Accordingly, in this condition, the bottoms 2A–6A of the pipes 2–6 are free-fitted in an unthreaded portion 7b of the threaded rod 7. However, center holes of the pipes 1–5 are formed as nut members 1D–5D which are capable of meshing with the threaded portion 7a. Incidentally, length of the threaded rod 7, which will be described below, is about one which permits the pipe 1 to almost entirely ascend from the position shown in FIG. 1.

Reference character 8 represents a rotation-driving means such as a motor whose output shaft is connected to the threaded rod 7. By cooperative action between the threaded portion 7a of the threaded rod 7 which is rotated or reversely rotated by output force of the driving means 8 and each of the nut members 1D–5D of the pipe bottoms 1A–5A, the pipes 1–5 are caused to sequentially ascend from the positions in FIG. 1 to extend or caused to descend in the reverse sequence to collapse. The mechanism of the present invention acts at the terminal of ascent of each of the pipes 1–5 or the starting point of descent of each of the pipes. The action will be described in detail below.

Figure 4:
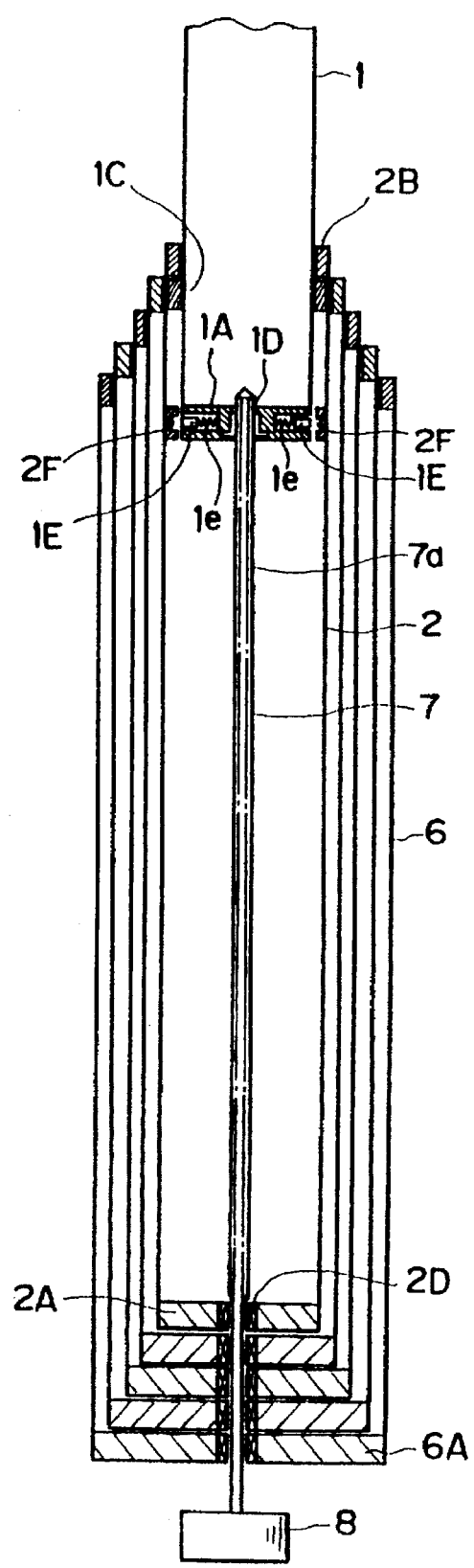
FIG. 4 is a sectional front view showing a first phase of operation of a key member of the mechanism according to the present invention at the final stage of extension of the first pipe.
Figure 5:
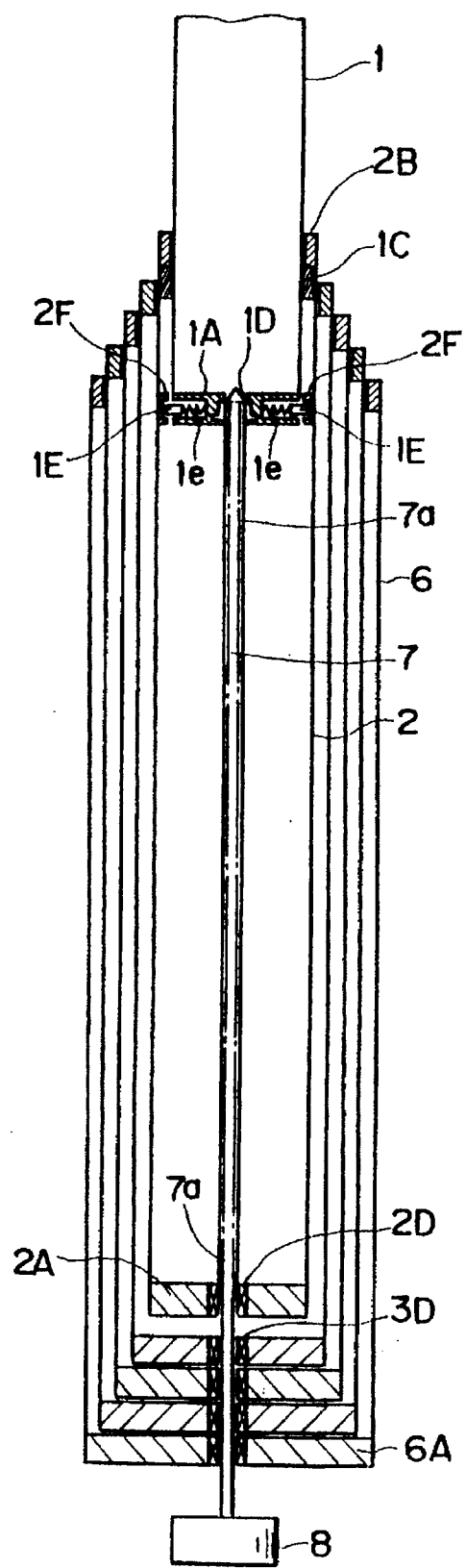
FIG. 5 is a sectional front view showing a second phase of operation of a key member of the mechanism according to the present invention at the final stage of extension of the first pipe.
Figure 6:
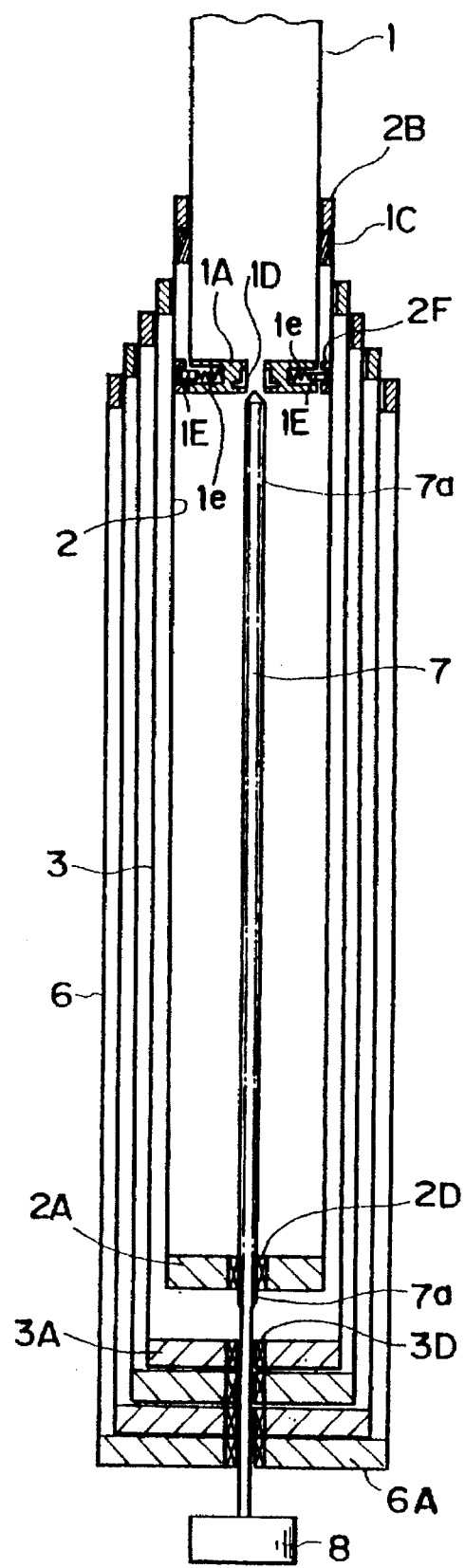
FIG. 6 is a sectional front view showing a third phase of operation of a key member of the mechanism according to the present invention at the final stage of extension of the first pipe.

The pipe 1 begins to ascend from the retracted position in FIG. 1 by rotation of the threaded rod 7, through the positions in FIGS. 2–5, to the position shown in FIG. 6, where the ascent of the pipe 1 by the action of the nut member 1D induced by the rotation of the threaded rod 7 is completed.

In this embodiment of the present invention, at the position where the limiter 1C of the pipe 1 abuts on the stopper member 2B of the pipe 2 in consequence of the ascent of the pipe 1 (see FIG. 4), the threaded portion 7a of the threaded rod 7 is still in mesh with the nut member 1D of the bottom of the pipe 1. Consequently, when the threaded rod 7 is caused to continue rotating, by cooperative action as a positioner between the limiter 1C of the pipe 1 and the stopper member 2B of the pipe 2, the pipe 1 ascends being accompanied by the pipe 2 along the rest of the threaded portion 7a.

The pipe 1 is required to be securely held by the pipe 2 at the terminal of the ascent where the limiter member 1C abuts on the stopper member 2B. Means for this purpose are, as illustrated in FIGS. 5 and 6, the key member 1E which protrudes outwardly from a side of the bottom 1A at the terminal of the ascent of the pipe 1 and the key receiving member 2F provided near the upper end of the inner surface of the pipe 2 as a counterpart of the key member 1E.

The key member 1E is required to be caused to outwardly protrude from a side of the bottom 1A at the position where it faces the receiving member 2F by the action of the limiter member 1C, and on the other hand, it is required to be contained within the bottom 1A during the ascent of the pipe 1. Accordingly, the key member 1E is contained in the bottom 1A while being biased forwardly from its back by means of a pusher spring 1e, and in order to permit the key member 1E to protrude only at the position where the bottom 1A faces the receiving member 2F as well as to keep it in the retracted position in the course of the ascent of the bottom 1A, a cam bar 9 is provided for keeping the key member 1E at the retracted position, which has its tip portion formed into a cam 9a for permitting advance of the key member 1E. Associative structure and function of the cam bar 9 and the key member 1E will be described with reference to FIGS. 10 and 7 to 9. In the present invention, instead of the use of the pushing spring 1e, a permanent magnet and a magnetic key member 1E may be arranged with their like poles faced each other to protrude the key member 1E by repulsive force between the magnet and the key member 1E.

Referring to FIGS. 10 and 7 to 9, in this embodiment, two cam bars 9 are vertically provided in parallel, each of which has a cam 9a at its upper end portion and extends through first the bottom 6A of the pipe 6 and then bottoms 5A–1A of the other pipes, and also in parallel with the threaded rod 7 extending through the bottoms of the pipes 1–6 in the collapsed condition. At the upper end portion of the cam bar 9, the cam 9a is formed as a face cam comprising a slant surface. In this embodiment, the height of the cam bar 9 is set to be such that the cam 9a is located at a level slightly lower than the upper end of the threaded rod 7.

Figure 10:
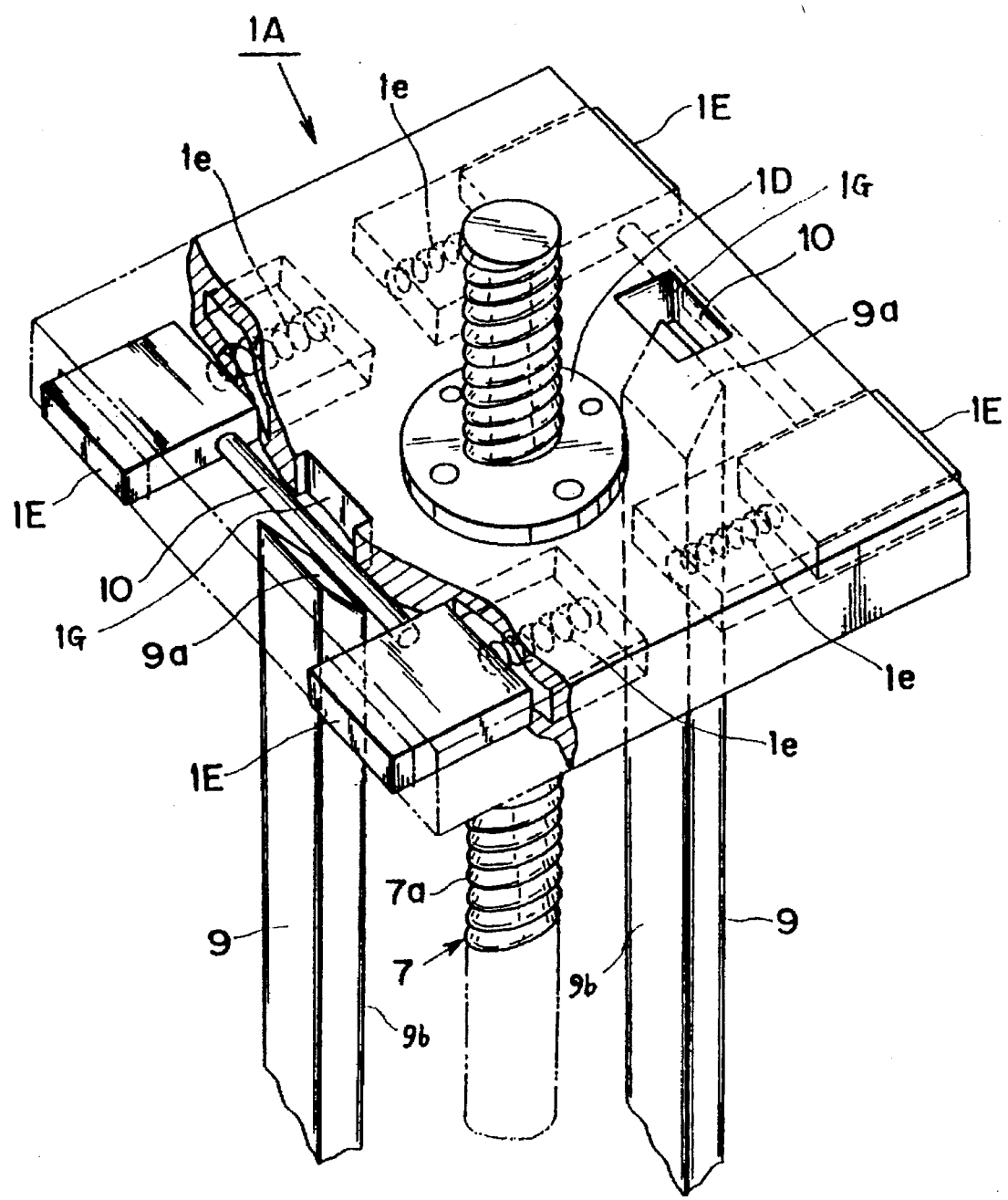
FIG. 10 is a perspective view characteristically showing one embodiment of a bottom structure of a pipe in the mechanism according to the present invention.

As shown in FIG. 10, in the bottom 1A which is square, key members 1E as a pair of block-shaped key members 1E are provided protrudably from and retractably into the thickness of the bottom 1A, with respect to each of right and left sides of the bottom 1A. Each of the key members 1E is always biased in the advance direction from its rear by means of a spring 1e. The key members 1E in each of the right and left sides are connected each other by a bar-like connecting member 10, and thus the coupled key members 1E in each of the right and left sides are adapted to move in parallel.

To render the connecting members 10 in the bottom 1A operative as cam follower members (the connecting member 10 is hereinafter referred to as a cam follower member), the cam bars 9 are so placed through two guide holes 1G formed through the bottom 1A as to be in tangential relationship with the cam follower member 10, and thus the follower members 10 are caused to abut upon the inner surfaces 9b of the cam bars 9 to keep the key members 1E which are biased by springs 1e at the retracted positions (see FIG. 7).

Figure 7:
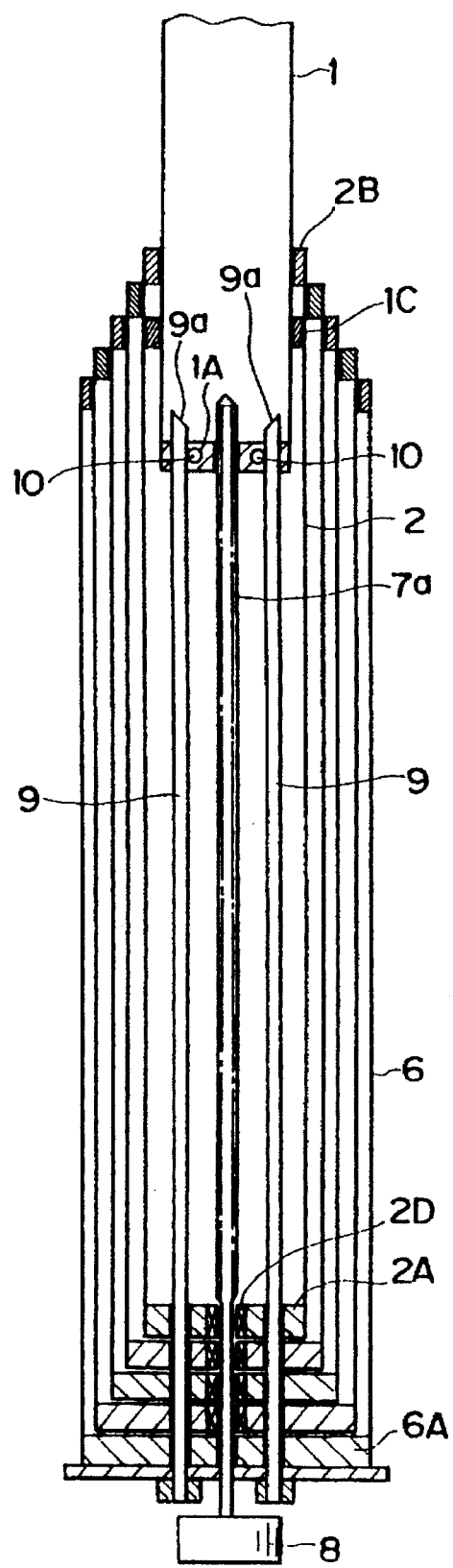
FIG. 7 is a sectional front view showing a first phase of operation of a cam of the mechanism according to the present invention in transition from the condition in FIG. 4 to the condition in FIG. 5.
Figure 8:
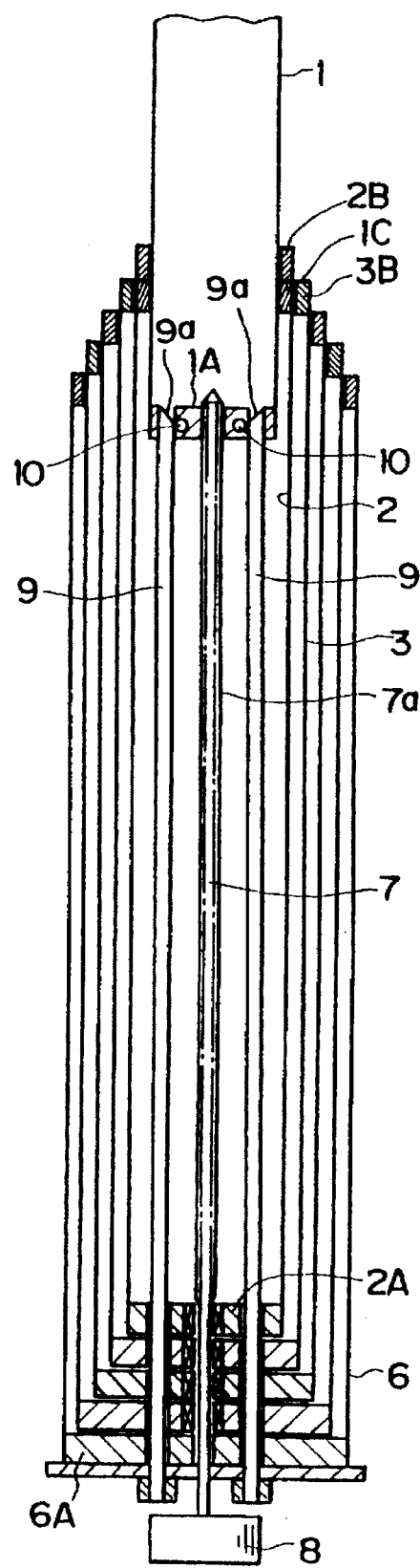
FIG. 8 is a sectional front view showing a second phase of operation of a cam of the mechanism according to the present invention in transition from the condition in FIG. 4 to the condition in FIG. 5.
Figure 9:
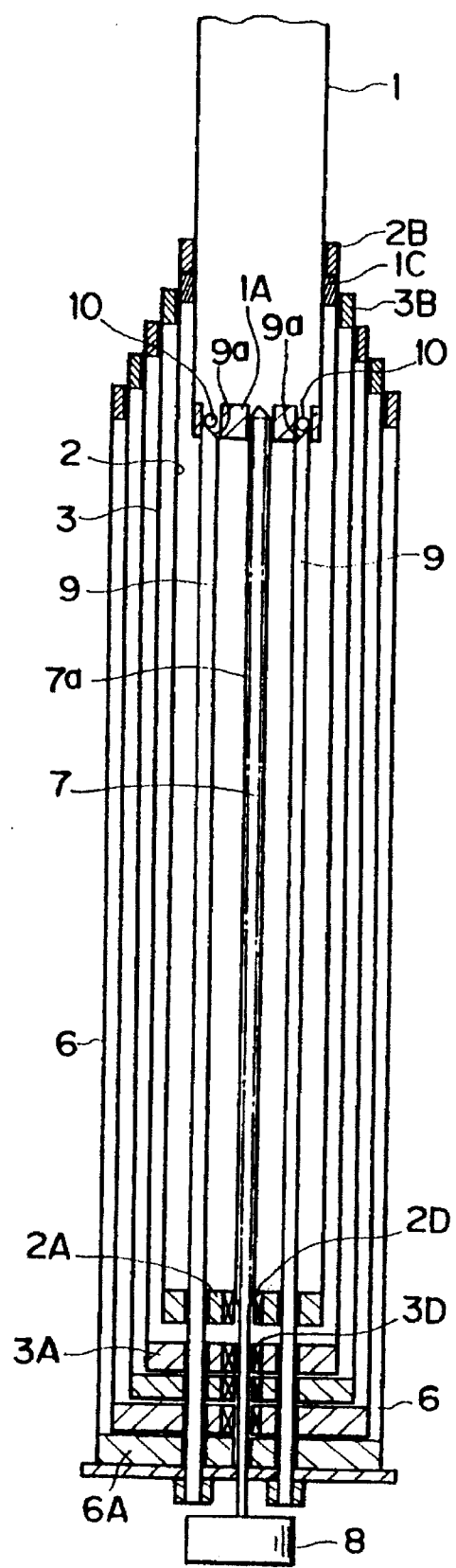
FIG. 9 is a sectional front view showing a third phase of operation of a cam of the mechanism according to the present invention in transition from condition in FIG. 4 to the condition in FIG. 5.

Accordingly, when the bottom 1A is at the position shown in FIG. 7, the key members 1E are kept at the retracted positions shown in FIG. 4 by means of the cam bars 9 and cam follower members 10. However, when the bottom 1A arrives at the position shown in FIG. 9 through the position shown in FIG. 8 by rotation of the threaded rod 7, each of the key members 1E which has been prevented from protruding by the abutment thereof upon the inner surface 9b of the cam bar 9 is caused to protrude from the side of the bottom 1A and to fit into the corresponding receiving member 2F by the action of the spring 1e which biases the key member 1E from the rear and the action of the cam follower member 10 which moves sliding on the slant surface of the cam 9a (see FIGS. 9 and 6). In this connection, amount of the displacement of the key member 1E between the protruded and retracted positions may preliminarily be set in an appropriate amount by selecting the size of the cam bar 9 or cam 9a, the position of the follower member 10 or the like. It is to be noted that, in the present invention, the key member 1E per se may serve concurrently as a cam follower member without use of a separate cam follower member, although the separate cam follower members 10 are used in this embodiment.

When each of the key members 1E in the pipe 1 is caused to fit into the receiving element 2F of the pipe 2, the pipe 1 and the pipe 2 are locked together. At this time, the nut member 1D of the bottom 1A is still just in mesh with the upper end of the threaded portion 7a while the nut member 2D of the bottom 2A of the pipe 2 becomes in mesh with the lower end of the threaded portion 7a (see FIG. 9).

In this case, if there is phase difference between the mesh of the nut member 1D with the threaded portion 7a and the mesh of the nut member 2D in the bottom 2A with the threaded portion 7a, the rotation of the threaded rod 7 is prevented. To cope with this, in the present invention, nut members 2D-5D are free-fitted and movable in the bottoms 2A-5A in the axial direction of the threaded rod by means of springs, respectively, so that the nut members 2D-5D respectively provided at the centers of the bottoms 2A-5A are permitted to move somewhat in the vertical direction to a point where meshes of the nut members with the threaded portion 7a become in phase. It is, of course, possible to use magnetic force instead of springs.

By elastically mounting the nut members 2D-5D as above, for example, even if there is phase difference between the mesh of the nut member 2D with the threaded portion 7a and the mesh of the nut member 1D with the threaded portion 7a, the nut member 2D moves to absorb the phase difference. Consequently, the nut member 2D meshes with the threaded portion 7a in phase with the nut member 1D to enable continued rotation of the threaded portion 7a to be ensured.

When the threaded rod 7 continues to rotate in this manner, the nut member 1D of the pipe 1 is disengaged from the upper end of the threaded rod 7 and the pipe 2 is caused to ascend to the upper end portion of the pipe 3 in the same manner as in the case of the pipe 1. Then, the pipe 2 is securely held at the upper end portion of the pipe 3 by the same action as in the case at the ascent terminal of the pipe 1. Then, the pipes 3, 4 and 5 are in turn securely held at the upper end portions of the pipes 4, 5 and 6, respectively, thereby extension of the telescopic device of this embodiment comprising the pipes 1 to 6 is completed.

Figure 11:
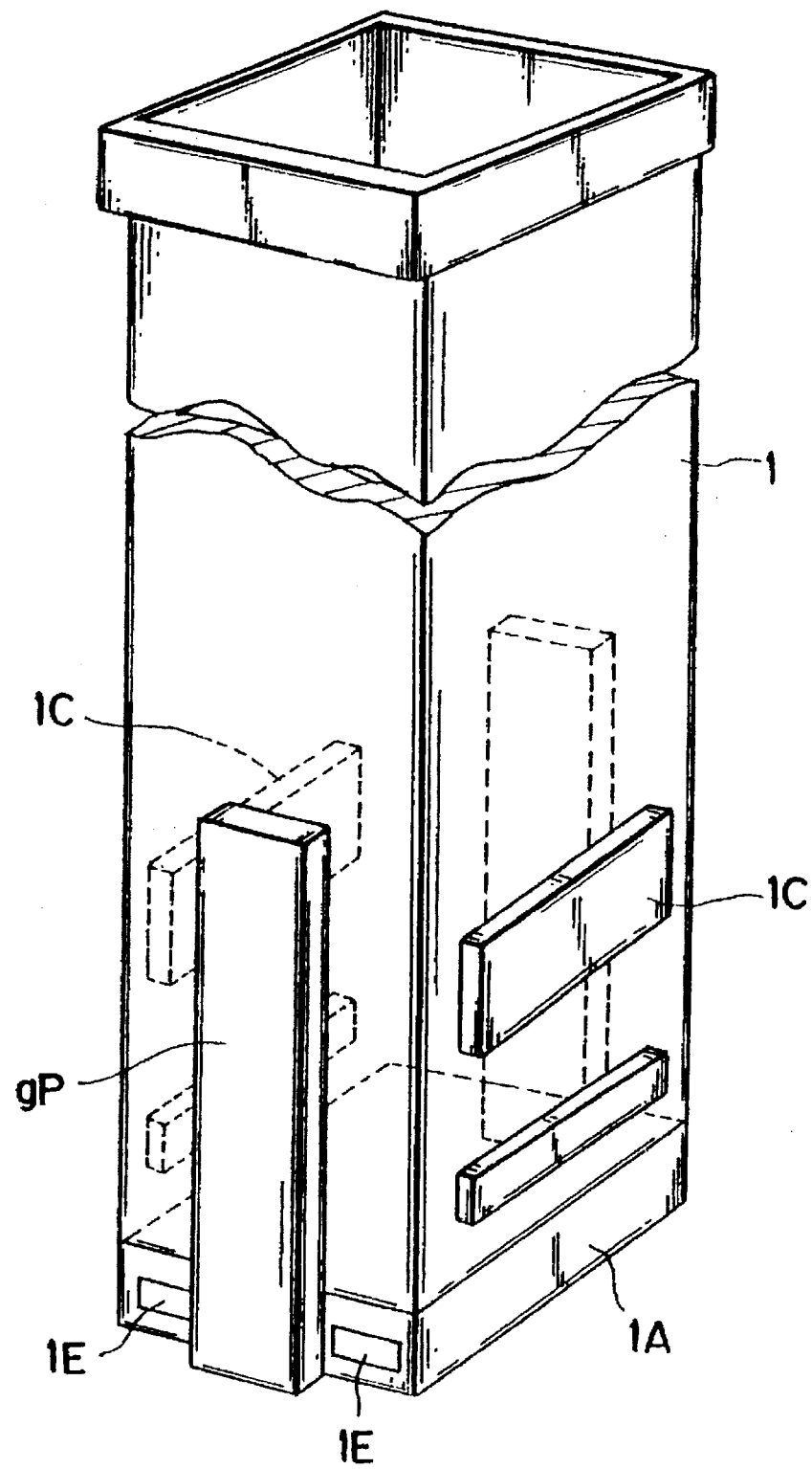
FIG. 11 is a perspective view of a lower portion of the first pipe having a bottom into which the mechanism according to the present invention in FIG. 10 is incorporated.
Figure 12:
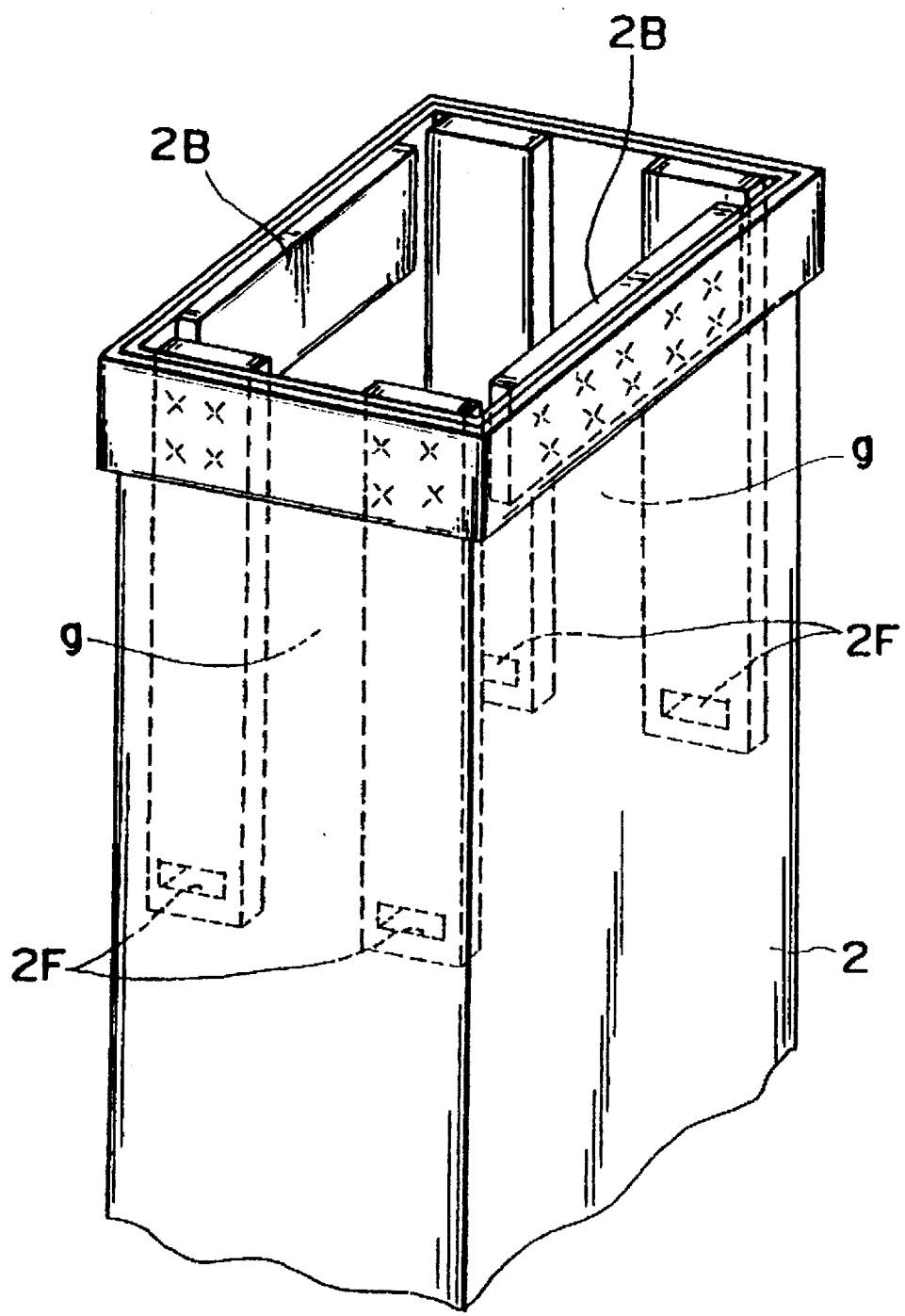
FIG. 12 is a perspective view of an upper portion of the pipe next to the pipe in FIG. 11.

One specific form of the joint portion for extension between the pipe 1 and the pipe 2 in the above embodiment will be described with reference to FIGS. 11 and 12. In the form shown in FIGS. 11 and 12, the pipes 1, 2 are formed to be of square in cross-section. In this connection, there is no particular restriction as to the cross-section of the pipes. However, the pipes generally have a polygonal cross-section. Particularly preferred is a triangular or square cross-section. The stopper members 2B at the upper end of the inner surfaces of the pipe 2 are formed by horizontally fixing plates to the upper end portions of the opposite inner surfaces of the pipe 2, and the key receiving members 2F are formed by vertically fixing two plates in parallel, each of which has a hole at its lower end portion, to each of the two inner surfaces which are the rest of the inner surfaces of the pipe.

On the other hand, the limiter members 1C of the pipe 1 are provided by horizontally fixing substantially the same plates as used as the stopper members 2B to two outer surfaces of the pipe 1, which correspond to the inner surfaces of the pipe 2 with the stopper members 2B provided thereon, at positions somewhat above the lower ends the outer surfaces. The bottom 1A is square in conformity with the (square) shape of the cross-section of the pipe 1. Four key members 1E are provided in the bottom 1A in such a manner that they are located correspondently to the four receiving members 2F provided on the pipes 2.

Two plates located at the upper portion of each of the above-mentioned inner surfaces of the pipe 2 provide the key receiving members 2F, and a groove is thereby defined between the plates. Accordingly, a guide plate gp as a counterpart of the groove g in the pipe 2 is provided on a lower end portion of each of the corresponding outer surfaces of the pipe 1.

The lower external structure of the pipe 1 including the bottom 1A and the upper internal structure of the pipe 2 are substantially in common with the lower external structures of the pipes 2–5 and the upper internal structures of the pipes 3–6, respectively. The limiter members 2C–5C (not shown) of the pipes 2–5 are located in lower end portions of the pipes 2–5 at positions sequentially lowered taking thickness of each of the bottoms 1A–5A into consideration in order to serve as positioner elements for positioning key members 2E–5E (not shown) of the pipes 2–5 at positions vis-a-vis with corresponding receiving members 3F–6F (not shown). Accordingly, in this embodiment, the height of the cam bar 9 is set to be such that when upward movement of the pipe 5 in the pipe 6 is completed, the cam follower member 10 as a connecting member between the key members 5E in the bottom 5A (which is the same as in the bottom 1A, and not shown) is located at a level permitting the cam follower member 10 to be actuated by the cam 9a at the upper end of the cam bar.

In other words, the level at which the cam 9a acts (i.e., the position of the cam 9a) is constant with respect to the bottoms 1A–5A of the pipes 1–5, the limiter members 1C–5C of the pipes 1–5 (,of which the limiter members 2C–5C are not shown, but the same as the limiter member 1C,) are located at differentiated positions in order to position each of the bottoms 1A–5A at the level. Thus, functions of the members described with respect to the upward movement of the pipe 1 are the same as those of the pipes 2–5 which are successively caused to ascend after completion of the upward movement of the pipe 1. The pipes 1 and 6 have only the lower external structure and the upper internal structure, respectively.

In the manner as described above, the pipes 1–5 are caused to upwardly advance from the pipes 2–6 in which the pipes 1–5 have been inserted, respectively, to complete extension and locking of the pipes. The device is used in the extended condition. After completion of the use, the extended device is collapsed by reversely rotating the threaded rod 7 to retract the pipes 5–1 into the pipe 6.

The retraction operation of the extended pipes 1–5 is started with the pipe 5 which has last been ascended and carried out in the order reverse to the extension operation. The nut member 5D (not shown) of the bottom 5A of the ascended pipe 5 at the terminal of the ascent of the pipe 5 remains in engagement with the upper end of the threaded portion 7a of the threaded rod 7.

Accordingly, when the threaded rod 7 is reversely rotated, the pipe 5 begins to descend by the cooperative action of the threaded rod 7 and the nut member 5D. At the starting point of the descent, the cam follower 10 is pressed against the slant surface of the cam 9a, so that the key members 5E (not shown), which have been released from the action of the cam 9a and caused to protrude from a side of the bottom 5A to fit into the receiving members 6F (not shown) by the action of springs 9e, is retracted into the bottom 5A.

Since the cam follower 10 becomes and then remains in abutment on the inner surface 9b of the cam bar 9 in the course of the descent of the bottom 5A along the threaded rod 7, the key members 5E are kept at the retracted positions. Accordingly, the bottom 5A descends within the pipe 6 until it is brought into abutment on or adjacency to the bottom 6A.

When the lower surface of the bottom 5A of the pipe 5 is brought into adjacency to the upper surface of the bottom 6A of the pipe 6, the nut member 5D of the bottom 5A leaves the lower end of the threaded portion 7a and enters the unthreaded portion 7b because of the threaded portion 7a being terminated at a position above the lower end of the threaded rod 7. However, the pipe is joined to the upper portion of the pipe 5 by the connection between the key member 4E of the bottom 4A and the receiving member 5F, and thus the nut member 4D of the bottom 4A of the pipe 4 becomes in mesh with the threaded portion 7a of the threaded rod 7 and begins to descend in the same manner as described above with respect to the pipe 5. In this manner, the pipes 1–5 are sequentially caused to descend to complete retraction of the pipes.

Figure 13:
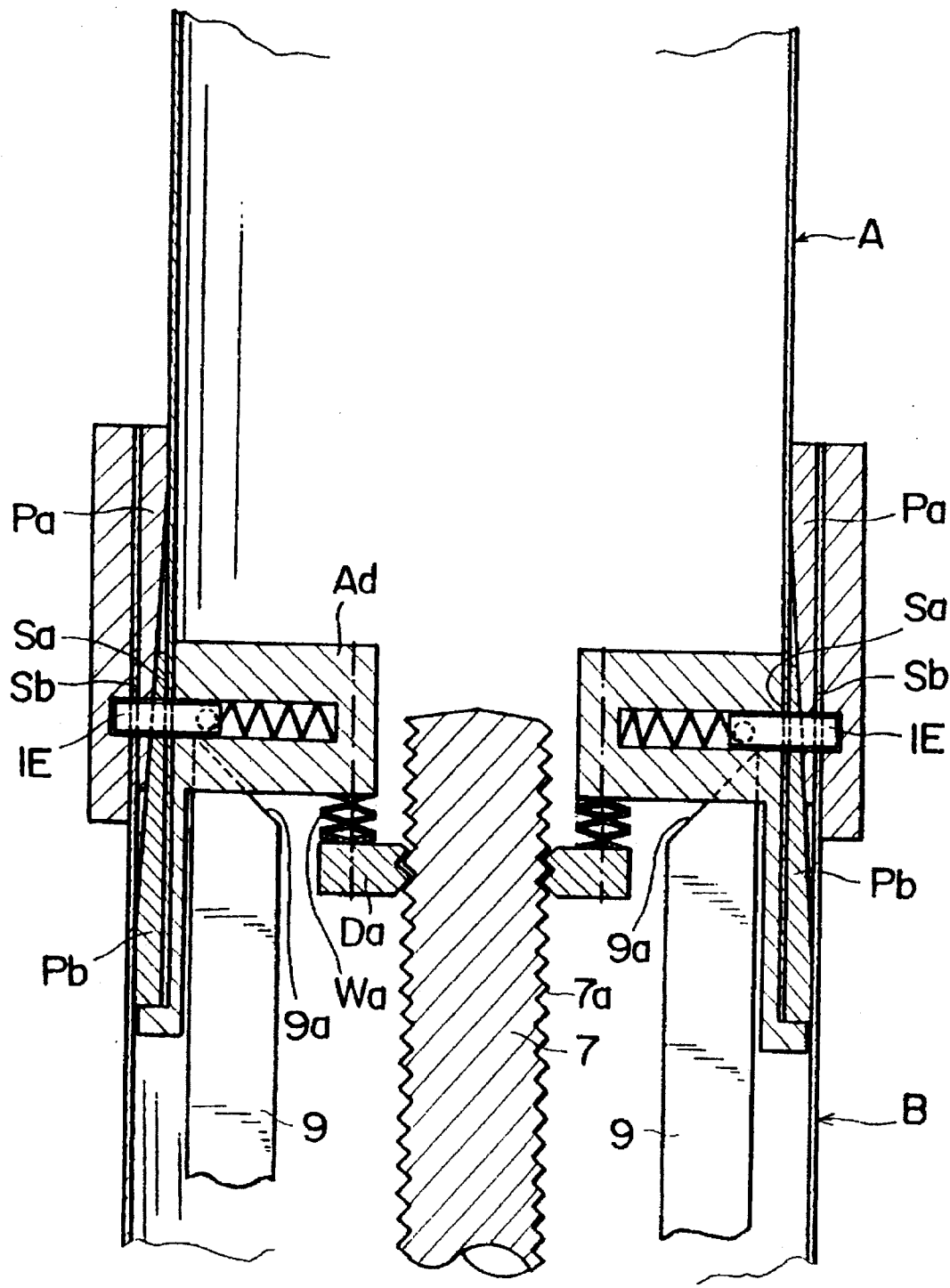
FIG. 13 is an enlarged sectional view of another form of the connection structure between two pipes.

FIG. 13 is a sectional view of another embodiment comprising telescopically neighboring pipes A and B which are adapted to be locked by keys 1E. In this embodiment, instead of the elements referred to as a limiter and a stopper in the above embodiment, positioner elements Pa, Pb which serve concurrently as sliding members are provided. These positioner elements characteristically have such tapered shapes that their sections are complementary. The keys 1E caused to protrude from the bottom Ad of the pipe A extend at the mid level of the positioner elements Pa and Pb complementarily overlapping each other through walls Sa, Sb of the pipes A, B and positioner elements Pa, Pb, thereby locking the pipes A and B. The pipe A and the pipe B are firmly connected as if they are integrally formed to constitute a columnar structure which is ideal for resisting any external forces exerted on a telescopic device in the longitudinal direction and the transverse direction. In FIG. 13, reference characters Da represent a nut member of a bottom Aa of the pipe A, and reference characters Wa represent a corrugated washer or disk spring, and the same reference characters represent the same members as in FIGS. 1 to 12.

Figure 14:
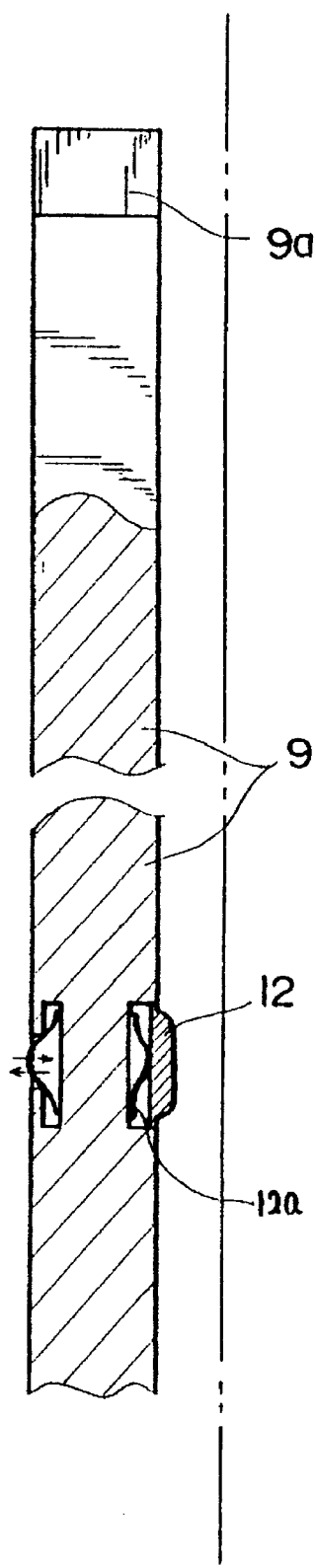
FIG. 14 is a fragmentary view of another form of the cam bar, partly in section.

In this embodiment, each of cam bars 9 is provided with button members 12 or leaf springs 13 which are protrudable from side surfaces of the cam bar 9 by spring action at a level slightly below the limit of descent the uppermost pipe, as illustrated in FIG. 14, thereby appropriately controlling vertical movements of bottoms of pipes passing the button members 12 or springs 13. Incidentally, reference characters 12a represent a spring for exerting projectional force on the button member 12. In other words, in the embodiment of FIG. 13, the button members or leaf springs function to prevent upward movement of the pipe B concomitant with ascent of the pipe A due to sliding frictional resistance between the pipe A and the pipe B until the positioner elements Pa and Pb of the pipes A and B abut on each other. When the positioner elements Pa and Pb of the pipes abut on each other, the pipe B is unified with the pipe A and strongly lifted by thread-created force. Consequently, the bottom (not shown in FIG. 13) of the pipe B causes the button members 12 to retract and passes over the button members 12 and arrives at the lower end of the threaded portion 7a of the threaded rod 7 as the starting point of meshing. Instead of the button members 12 or leaf springs 13, retractable button members utilizing repulsive force between permanent magnets may be used.

As shown in FIG. 13, the bottom Aa of the pipe A is provided with a nut members Da via a corrugated washer Wa having elasticity. The same is true of the bottom (not shown in FIG. 13) of the pipe B. Accordingly, when the pipe A and the pipe B locked thereto are moved upwardly by rotation of the threaded rod 7 and the nut member of the pipe B is brought to be just about to engage with the lower end of the threaded portion 7a of the threaded rod 7 as the starting point of meshing, even if there is phase difference between thread of the threaded rod and thread of the nut member, the nut member of the bottom of the pipe B freely moves to a position where phase coincidence is attained by the spring action of the corrugated washer Wa provided thereon and surely becomes in mesh with the starting point of the threaded portion 7a. It is of course possible to use, instead of the washer Wa, a disk spring or a rubber type or synthetic resin type elastic member which has function equivalent thereto. Accordingly, with respect to each of the nut members 1D–5D and each of the bottoms 1A–5A of the pipes 1–5 in the previously described embodiment, it is also possible to interpose a corrugated washer, a disk spring, or a rubber type elastic member or the like therebetween, as described in this embodiment.

In each of the above-described embodiments, the key members provided in each of the bottoms are caused to advance or retract by the actions or the cam bar with the cam and the springs to cause the key members to be fitted into or dawn from the corresponding receiving members, thereby attaining function as a mechanism for locking-unlocking between the pipes. In the present invention, however, the key members and the corresponding receiving members may be located at converse positions relative to the positions in the above embodiments. In other words, the receiving members are retractably provided in the bottoms and the key members are stationarily mounted at the positions where the receiving members are located in the above embodiments.

The locking-unlocking mechanism of the present invention has been described with respect to the embodiments using the threaded rod 7 and the nut members 1D-5D incorporated in the bottoms 1A-5A of the pipes 1-5 for transmitting ascensive-descensive force. However, the locking-unlocking mechanism is applicable to those using fluid pressure such as oil pressure, water pressure or air pressure to obtain ascensive-descensive force, those using extensional-retractive movement of a convex coil of a soft steel strip to obtain ascensive-descensive force, and the like, irrespective of types of driving force for extension-retraction.

The present invention is as described above, and in a telescopic device comprising a plurality of pipes telescopically arranged, the locking-unlocking mechanism comprises:

a bottom provided at the lower end of the lowermost pipe, a cam bar formed with a cam at its upper end, the cam bar being a rod vertically mounted on the bottom of the lowermost pipe and extending through the bottoms of the pipes other than the bottom of the lowermost pipe, a bottom provided at the lower end of each of the pipes other than the lowermost pipe, the bottom including:

a cam follower disposed in tangential relationship with the cam bar and actuated by the cam, key members connected to each other by the cam follower and each connected to a spring for biasing the cam follower against the cam bar, the key members being thereby protrudable from a side surface of the bottom, and key member receiving members provided at a position in the vicinity of the upper end of the inner surface of each of the pipes other than the uppermost pipe for receiving the key members caused to protrude from the side surface of the bottom by the action of the cam.

It is, therefore, possible to constitute and provide a locking-unlocking mechanism with a relatively simplified structure, which is capable of realizing firm and reliable connection between pipes when a plurality of pipes telescopically arranged are extended, and capable of disconnecting the connected pipes rapidly and precisely.

In particular, the locking-unlocking mechanism according to the present invention bas such a structure that the cam bar, which controls protrusion and retraction of the key member for connecting-disconnecting neighboring pipes, extends inside the pipes through the bottoms for common use. This is a unique feature that is not found in conventional locking-unlocking mechanisms and extremely useful to carry out locking-unlocking of pipes. In conventional mode, cam mechanisms are provided at positions in the vicinities of the upper and lower ends of each of pipes, and the pipes are locked to each other by means of a ratchet, pin, latch or the like. Accordingly, such a mode is applicable only to thick-walled pipes, thus leading to a telescopic device of heavy weight. Further, since cam mechanisms are used in a large number, troubles are likely to be caused due to wrong operation. On the other hand, the present invention is free from these drawbacks and hence practically extremely advantageous.

What is claimed is:

1. A telescopic device comprising a plurality of pipes which are telescopically arranged, and a locking-unlocking mechanism, said locking-unlocking mechanism comprising:

a bottom provided at a lower end of a lowermost one of said plurality of pipes, a cam bar formed with a cam at its upper end, the cam being a rod vertically mounted on said bottom of the lowermost pipe and extending through bottoms of others of said plurality of pipes, plural bottom sections, each provided at a lower end of one of the pipes other than the lowermost pipe, each of said bottom sections including:

a cam follower disposed in tangential relationship with the cam bar and actuated by the cam, and key members connected to each other by the cam follower and each connected to a spring for biasing the cam follower against the cam bar, the key members being thereby protrudable from a side surface of said bottom section, and key member receiving members provided at a position in the vicinity of an upper end of an inner surface of each of said plurality of pipes other than an uppermost of said pipes for receiving the key members caused to protrude from the side surface of said bottom sections by the action of the cam.

2. The telescopic device according to claim 1, wherein positioner elements for precisely aligning positions of the key member and the key receiving member are provided on the pipes adjoining each other.

3. The telescopic device according to claim 2, wherein the positioner elements have the same cross-section and are mounted on the inner surface of the outer pipe and on the outer surface of the inner pipe in such a manner that they are at different levels when two of the positioner elements abut each other.

4. The telescopic device of claim 2, wherein a retractable projection is provided on a side surface of the cam bar for resisting movement of one of the pipes due to friction from movement of another one of the pipes.

5. The telescopic device of claim 4 wherein the retractable projection comprises one of a spring and a magnet for moving the retractable projection.

6. The telescopic device of claim 5 further comprising means to drive the pipes upward and downward for extension and retraction, said means to drive comprising one of a threaded member and a nut, and means for providing fluid pressure.

7. The telescopic device of claim 6 further comprising a threaded rod for telescoping said pipes, and wherein each said bottom section further comprises a nut member for moving axially on the threaded rod and a member having spring function for allowing further movement of the nut member in the axial direction relative to the threaded rod.

8. The telescopic device according to claim 2, wherein the positioner elements have cross-sections which are complementary to each other and are mounted on the inner surface of the outer pipe and on the outer surface of the inner pipe in such a manner that they are at the same level when two of the positional elements abut each other.

9. The telescopic device according to claim 1, wherein a retractable projection is provided on a side surface of the cam bar for resisting movement of one of the pipes due to friction from movement of another one of the pipes.

10. The telescopic device according to claim 9, wherein the retractable projection comprises one of a spring and a magnet for moving the retractable projection.

11. The telescopic device of claim 1 further comprising means to drive the pipes upward and downward for extension and retraction, said means to drive comprising one of a threaded member and a nut, and means for providing fluid pressure.

12. The telescopic device according to claim 1, further comprising a threaded rod for telescoping said pipes, and wherein each said bottom section further comprises a nut member for moving axially on the threaded rod and a member having spring function for allowing further movement of the nut member in the in the axial direction relative to the threaded rod.

13. A locking-unlocking mechanism for a telescopic device with a plurality of telescopically arranged pipes, the locking-unlocking mechanism comprising:

a cam bar with a cam at one end, the other end of said cam bar for being mounted on an end of a lowermost pipe of said plurality of telescopically arranged pipes so that said cam bar extends vertically into the pipes;

plural bottom sections, each for being mounted on an end of one of the pipes other than the lowermost pipe, each of said bottom sections comprising, a cam follower disposed in tangential relationship with said cam bar and for being actuated by said cam, and key members connected to each other by said cam follower and each connected to a spring for biasing said cam follower against said cam bar, said key members being thereby protrudable from a side surface of said bottom section; and plural key member receiving members for receiving said key members caused to protrude from the side surface of said bottom section by the action of said cam, each said key member receiving member for being mounted adjacent an upper end of one of the pipes other than the uppermost pipe.

14. The locking-unlocking mechanism for a telescopic device according to claim 13, further comprising positioner elements for being mounted on an inner surface of one pipe and on an outer surface of an adjacent pipe for blocking movement of the two pipes on which said positioner elements are mounted relative to each other in one direction.

15. The locking-unlocking mechanism for a telescopic device according to claim 14 wherein said positioner elements have angled faces for slidable engagement when two of said positioner elements are aligned at the same level in the pipes.

16. The locking-unlocking mechanism for a telescopic device according to claim 14 wherein said positioner elements have similar cross sections for engagement when two of said positioner elements are aligned at different levels in the pipes.

17. The locking-unlocking mechanism for a telescopic device according to claim 13 further comprising a retractable projection on a side surface of said cam bar for resisting movement of one of the pipes due to friction from movement of another one of the pipes.

18. The locking-unlocking mechanism for a telescopic device according to claim 17, wherein said retractable projection comprises one of a spring and a magnet for moving the retractable projection.

* * * * *